Feb. 10, 1959    H. R. SIGLER ET AL    2,872,727
MACHINE FOR ASSEMBLING RESILIENT BUSHINGS
Filed July 28, 1953    4 Sheets-Sheet 1
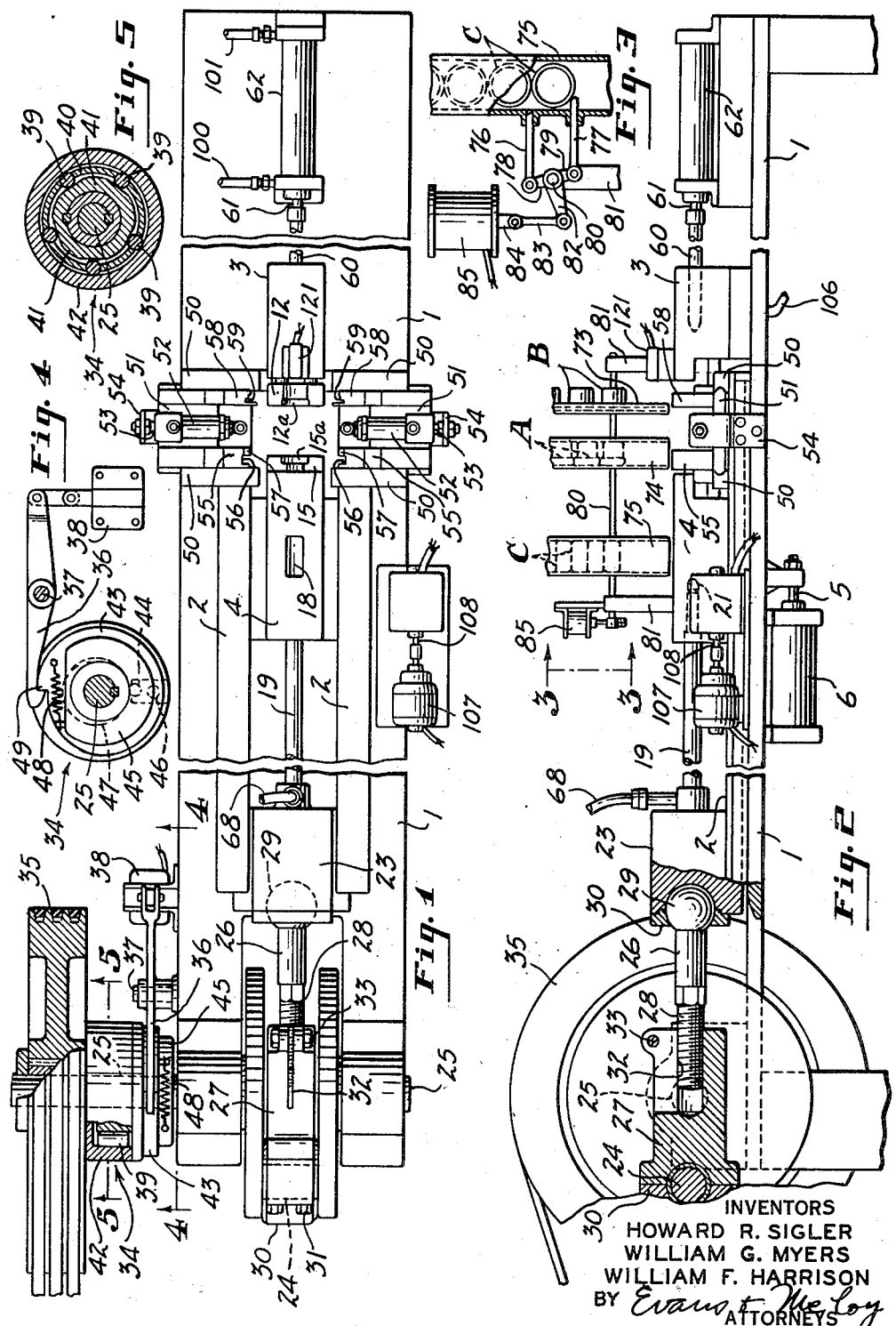
INVENTORS
HOWARD R. SIGLER
WILLIAM G. MYERS
WILLIAM F. HARRISON
BY Evans & McCoy
ATTORNEYS

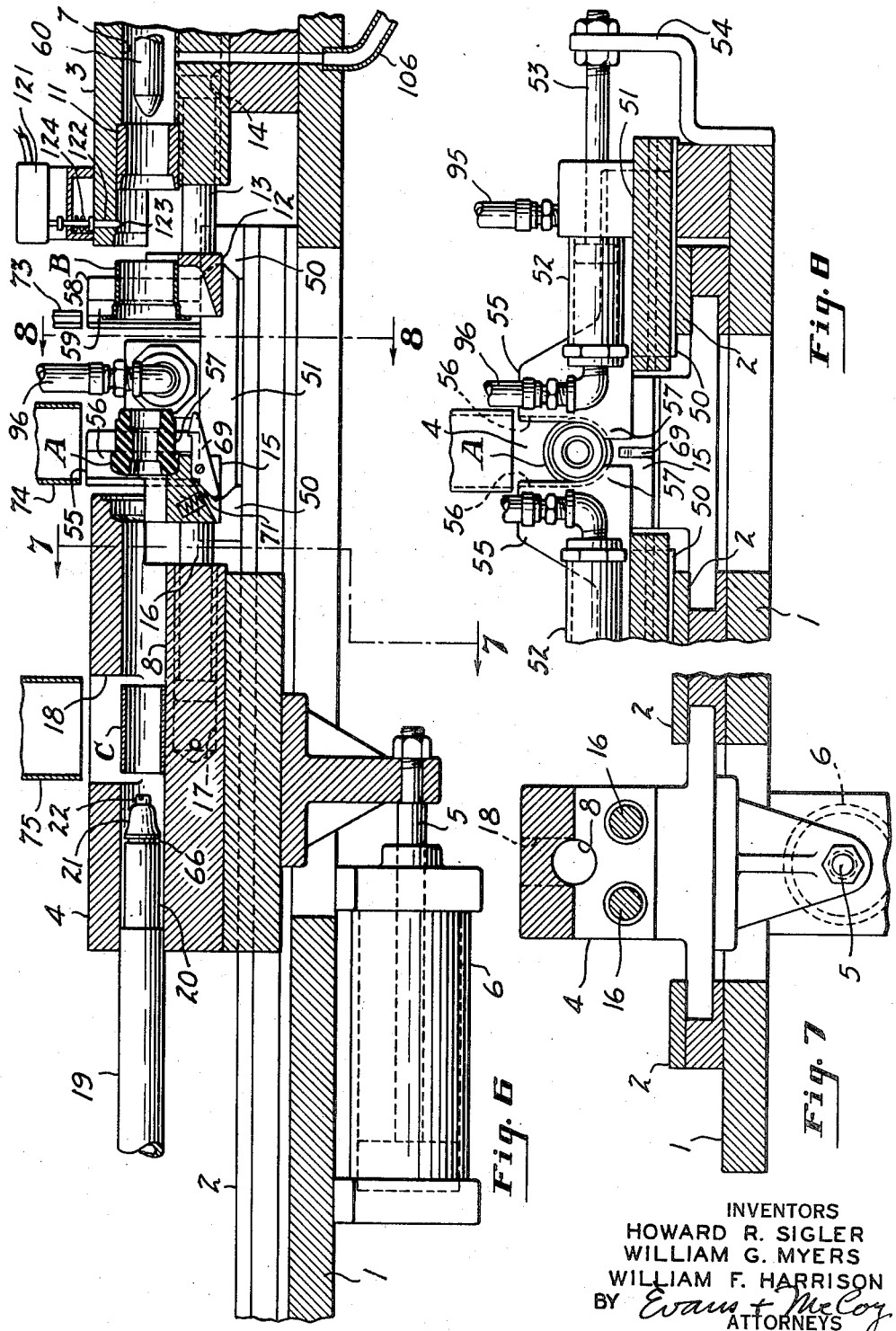

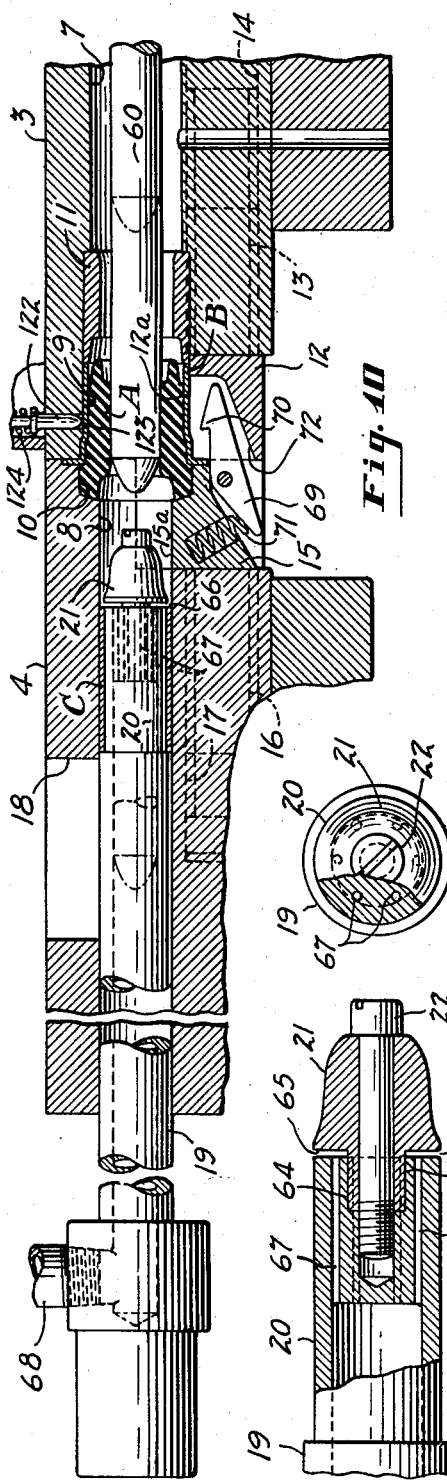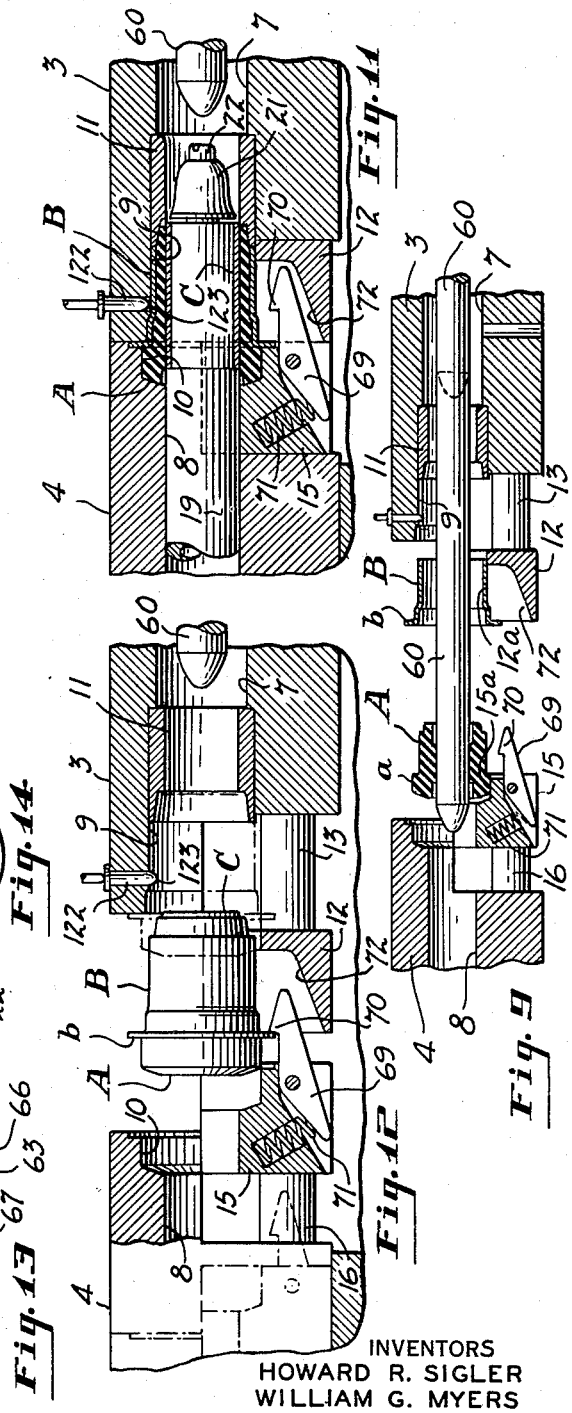

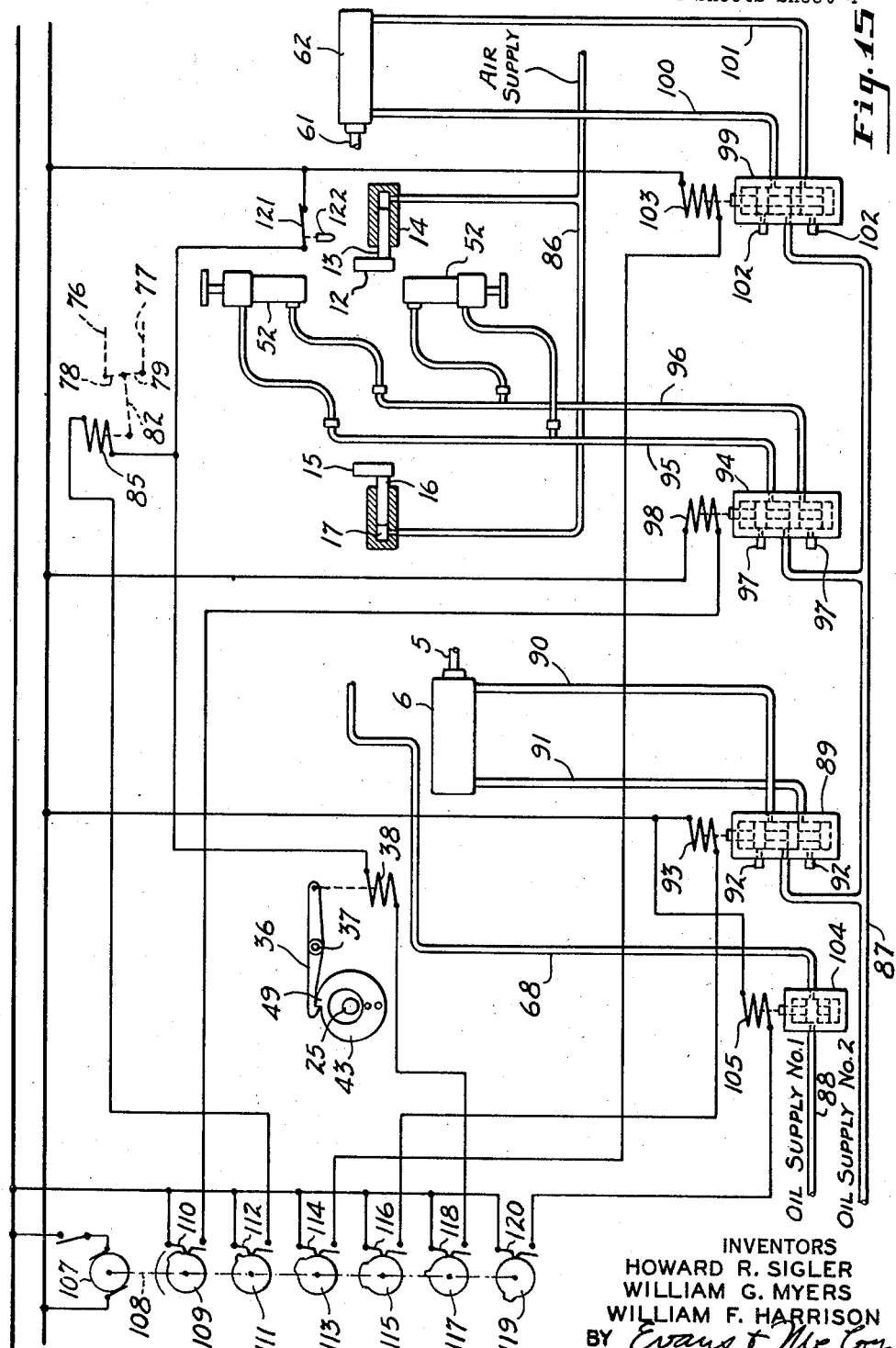

United States Patent Office 2,872,727
Patented Feb. 10, 1959

2,872,727
MACHINE FOR ASSEMBLING RESILIENT BUSHINGS

Howard R. Sigler, Monticello, William Gordon Myers, Kewanna, and William F. Harrison, Logansport, Ind., assignors to The General Tire and Rubber Company, Akron, Ohio, a corporation of Ohio Application July 28, 1953, Serial No. 370,783

14 Claims. (Cl. 29—235)

This invention relates to machines for assembling resilient bushings of the type in which an elastic tubular rubber insert is positioned between an outer rigid sleeve and an inner rigid tubular core under sufficient radial compression to provide a firm frictional bond between the elastic rubber and the sleeve and core.

The machine of the present invention has two work pressing members for forcing the rubber insert into the outer sleeve and these members are mounted for relative linear movement preferably on a horizontal bed, one toward and away from the other into and out of work gripping position. The work pressing members act upon a sleeve and a tubular elastic rubber insert which are supported between them in axial alinement, the work pressing members acting to clamp the insert and alined sleeve and force the elastic rubber insert into the sleeve.

The machine has also a core inserting plunger which is so positioned with respect to the work pressing members that it is in axial alinement with a sleeve and insert gripped by the work pressing members, the core inserting plunger being movable through one of the work pressing members and into an insert which has previously been forced into a sleeve by the work pressing members to insert a core within the insert while the insert and sleeve are clamped by the work pressing members.

Retractable supporting elements are provided for supporting the insert and sleeve between the work pressing members and these supporting elements are moved into place between the work pressing members when the work pressing members are spaced apart. In their work supporting positions and supporting elements receive and support a sleeve and an insert in axial alinement with each other and with the core inserting plunger, the supporting elements being designed to permit relative axial movements of the sleeve and insert as one work pressing member moves toward the other, so that the insert is caused to enter the sleeve and is forced into the sleeve as the work pressing members move toward work clamping position.

The work pressing members and the core inserting plunger are operated in timed relation and means is provided for supporting the core between the plunger and sleeve in axial alinement with the plunger and with the sleeve into which the insert has been forced, so that the core can be advanced by the plunger and pressed by the plunger into the insert within the sleeve.

Means is provided for delivering a sleeve and insert to the retractable supporting elements and a core to the core supporting means while the work pressing members are separated and while the plunger is in retracted position.

The actuating means for the work positioning and work pressing means, the sleeve, insert and core feeding means and the core inserting means are so controlled that the positioning means, the feeding means, the work pressing means and the core inserting means are operated in proper sequence to enable the insert to be forced into the sleeve by the work pressing means and the core to be forced into the insert while the sleeve and insert are clamped between the work pressing members.

The core inserting plunger has a reduced end portion upon which the tubular core fits and the reduced end portion terminates in a tapering end that facilitates the entry of the reduced end of the plunger into the core and the entry of the plunger into the rubber insert. In order to prevent damage to the rubber insert by engagement of the end of the tubular core with the insert during the assembly, means is provided for delivering fluid, preferably a liquid under pressure, through the plunger and discharging it radially outwardly against the interior of the rubber insert immediately in advance of the leading end of the core during the entry of the core into the rubber insert. The fluid under pressure creates a localized pressure that expands the portion of the insert immediately in advance of the end edge of the tubular core as the core is advanced through the insert, preventing engagement of the end of the core with the insert during its insertion.

The invention has for an object to provide an automatic continuously operable machine that assembles a resilient bushing of the character described during each cycle of operation.

Other objects are to provide improved means for positioning the parts to be assembled and for holding them in alinement during the assembling operations, to provide a simple means of ejecting the assembled bushings and to provide improved means for actuating and for timing the actuations of movable parts of the machine.

Reference should be had to the accompanying drawings, in which:

Figure 1 is a plan view of the machine embodying the invention;

Fig. 2 is a side elevation of the machine;

Fig. 3 is a side elevation of the mechanism for feeding the parts to be assembled to the machine, viewed as indicated at 3—3 in Fig. 2;

Fig. 4 is a section taken on the line indicated at 4—4 in Fig. 1, showing the single revolution clutch for connecting the crankshaft that operates the core inserting plunger to a continuously driven driver;

Fig. 5 is a section through the single revolution clutch taken on the line indicated at 5—5 in Fig. 1;

Fig. 6 is a fragmentary central longitudinal vertical section showing the work positioning members in work receiving position, the work pressing members in their separated positions and the core inserting plunger in retracted position;

Fig. 7 is a transverse vertical section taken on the line indicated at 7—7 in Fig. 6;

Fig. 8 is a transverse vertical section taken on the line indicated at 8—8 in Fig. 6;

Fig. 9 is a fragmentary central longitudinal section showing the alining pin in engagement with the tubular insert to guide it into engagement with the sleeve;

Fig. 10 is a fragmentary central longitudinal section showing the work pressing members in closed position and clamping the sleeve and insert between them;

Fig. 11 is a fragmentary longitudinal section through the work gripping portions of the work pressing members, showing the core inserting plunger advanced to the position where the tubular core is in place within the rubber insert;

Fig. 12 is a fragmentary longitudinal section indicating the manner in which the assembled bushing is ejected from the machine;

Fig. 13 is a fragmentary view showing the core receiving end of the core inserting plunger in longitudinal section;

Fig. 14 is an end elevation of the core inserting plunger; and

Fig. 15 is a diagrammatic view showing the fluid pressure system and the timer for actuating the cylinder controlling valves, the plunger controlling clutch and the article feeding means.

The machine of the present invention is designed to assemble a resilient bushing, which, as shown in Figs. 11 and 12, has a tubular insert A of elastic rubber which is disposed between an outer sleeve B and an inner tubular core C under radial compression sufficient to firmly bind both the inner rigid core and the outer rigid sleeve to the rubber. The bushing herein shown is designed for use on vertically disposed pivots, the sleeve B being provided with a circumferential supporting flange *b* at its upper end portion *a* that projects above the sleeve and bears upon the flange *b*.

As herein illustrated, the machine of the present invention is mounted on a suitable horizontal bed 1 which is provided with a longitudinal way 2 and includes a sleeve and insert assembling press that comprises a pair of work pressing members 3 and 4 mounted on the bed 1 for relative linear movement, one toward and away from the other 3. As herein shown, the member 3 is mounted in fixed position on the bed adjacent one end thereof and the member 4 is slidable on the bed and is guided for longitudinal movement along the way 2. The work pressing member 4 is moved toward and away from the work pressing member 3 by means of a piston 5 operated by a fluid pressure cylinder 6.

As best shown in Figs. 6 and 10, the work pressing members 3 and 4 are provided with axially alined bores 7 and 8 that are parallel to the way 2. At their opposed faces the work pressing members 3 and 4 have counterbores 9 and 10, the counterbore 9 forming a socket to receive a sleeve B and the counterbore 10 providing a socket in which an end of the insert A fits. The counterbore 9 is of a depth to receive substantially the entire sleeve B and may be provided with a removable stop sleeve 11 for engagement with the sleeve B, the sleeve 11 being readily removable and replaceable with other sleeves of different lengths to accommodate longer or shorter sleeves.

The work pressing members 3 and 4 serve to force the rubber insert A into the sleeve B and, in order to enable this to be done while the movable member 4 moves into engagement with the stationary member 3, means is provided for supporting an insert A and a sleeve B in axial alinement between the members 3 and 4. The insert and sleeve supporting means comprises retractable supporting elements that are movable into positions between the work pressing members 3 and 4 when the work pressing members are separated.

As most clearly shown in Fig. 6, the stationary work pressing member 3 carries a supporting element 12 that forms part of its clamping face, the part 12 having a top face in the plane of the axis of the counterbore 9 and being mounted on a pair of pistons 13 disposed parallel to the bed 1 and to the axis of the counterbore 9, the pistons 13 being slidable in cylinders 14 to move the supporting element 12 to a position inwardly of the clamping face of the member 3 as shown in Fig. 10. Since the top of the supporting element 12 conforms to the lower half of the counterbore 9, it provides a sleeve receiving seat 12a on which a sleeve B may be supported in axial alinement with the counterbore 9.

The movable work pressing member 4 carries a retractable supporting element 15 that forms the lower part of its clamping face and that has a top face in the plane of the axis of the counterbore 10. The supporting element 15 is mounted on a pair of pistons 16 that are parallel to the bore 8 and that slide in cylinders 17 formed in the member 4. Since the top of the element 15 conforms to the lower half of the counterbore 10, it provides a concave insert receiving seat 15a.

During operation of the machine air under pressure is supplied to the cylinders 14 and 17 for yieldably pressing the supporting elements 12 and 15 toward one another so that the supporting elements 12 and 15 automatically move to sleeve and insert receiving positions when the member 4 is moved away from the stationary member 3.

The bore 8 of the work pressing member 4 is of a diameter but slightly greater than the external diameter of the core C and the member 4 is provided with an opening 18 through which a core C may be entered into the bore 8. A plunger 19 is slidable in the bore 8 toward and away from the stationary work pressing member 3, the plunger 19 when in its retracted position as shown in Fig. 6 being positioned beyond the core receiving opening 18 so that it may engage with the core C in the bore 8 when it is moved toward the stationary member 3. The plunger 19 slidably fits in the bore 8 and has a core receiving end portion 20 of reduced diameter which enters the core as shown in Fig. 10 during movement of the plunger toward core inserting position. At its inner end the plunger has a tapered pilot portion 21 that is detachably secured thereto by suitable means such as an attaching bolt 22.

The plunger 19 is attached at its outer end to a slide 23 mounted in the way 2 that is reciprocated on the bed by any suitable means such as a crank 24 carried by a horizontal shaft 25 extending across the bed 1. The crank 24 is connected to the slide 23 through an extensible connecting rod formed by adjustably connected sections 26 and 27 connected respectively to the slide 23 and the crank 24. A screw threaded connection 28 is provided between the connecting rod sections 26 and 27 and the section 26 is connected to the slide 23 by a ball and socket joint 29 which provides a universal pivot between the connecting rod and slide and which permits the section 26 to be rotated to lengthen or shorten the connection through the screw 28. The section 27 of the connecting rod is attached to the crank 24 by means of a detachable bearing cap 30 held in place by bolts 31. The member 27 is provided with a split threaded socket 32 and a clamping bolt 33 by means of which the threaded connection 28 can be locked in adjusted position.

A single revolution is imparted to the crankshaft 25 once during each cycle of operation of the machine to impart a reciprocating stroke to the plunger 19 to force a core C into an insert A that is clamped with a sleeve B in the socket 9 by the member 4. To actuate the crankshaft 25, a single revolution clutch 34 is interposed between the shaft 25 and a continuously driven flywheel pulley 35. Any suitable trip controlled single revolution clutch may be employed that is adapted to be controlled by a suitable trip member such as the trip latch 36 that is shown connected by a pivot 37 to the bed 1 and that is actuated by a solenoid 38.

As herein shown, the clutch 34 has a series of driving rollers 39 mounted in an annular cage 40 that is rotatably mounted on the shaft 25. The rollers 39 are interposed between the flat faces of a polygonal cam 41 attached to the shaft 25 and the cylindrical interior face of a driving drum 42 that is attached to the pulley 35. When the rollers 39 are positioned on the central portions of the flat faces of the cam 41 they permit free rotation of the drum 42, but when the cage 40 is shifted angularly with respect to the shaft 25 the rollers 39 are wedged between the flat faces of the cam 41 and the interior surface of the drum 42 so that the cam 41 and shaft 25 are caused to rotate with the drum 42. For shifting the cage 40 angularly, a disk-shaped lever 43 is provided which is connected by a horizontal pivot 44 to a collar 45 fixed to the shaft 25. A lever 43 is also connected by a horizontal pivot 46 to the cage 40. When the disk 43 is swung about the pivot 44 a turning movement is imparted to the cage 40 and, in order to permit the disk 43 to have a swinging movement about the pivot 44, the disk 43 is provided with a central opening 47 that is considerably larger than the portion of the shaft 25 which extends through it. A spring 48 connected at one end to the collar 45 and at its opposite end to the disk 43 exerts a thrust on the disk 43, tending to move it in a direction to shift the cage 40 and rollers 39 to a position where the rollers 39 are wedged between the faces of the cam 41 and the interior of the drum 42. The disk 43 turns with the shaft 25 when the shaft is clutched to the driving pulley and is provided with a periphery against which the latch 36 presses and has a tooth 49 with which the trip latch 36 engages. Engagement of the tooth 49 with the latch 36 swings the disk 43 in a direction opposite that toward which it is urged by the spring 48, shifting the cage 40 and rollers 39 to drum releasing position and holding the shaft 25 against further turning movement. When tripped the latch is momentarily lifted to release the disk 43 and then drops back into engagement with the periphery of the disk 43. Upon release of the latch 36 the spring 48 shifts the disk 43 to engage the clutch, causing the shaft to rotate through one revolution until the tooth 49 again engages the latch 36 to release the clutch and stop rotation.

Adjacent the stationary work pressing member 3 the bed 1 is provided with alined transverse ways 50 disposed at right angles to the path of travel of the work pressing member 4 and these ways carry identical oppositely movable work positioning slides 51 that are movable into the space between the work pressing members 3 and 4 when the work pressing member 4 is in its retracted position. The slides 51 have cylinders 52 mounted thereon which are parallel to the ways 50 and that slide on fixed pistons 53 that are attached to brackets 54 secured to opposite sides of the bed 1. Pressure is supplied to the outer ends of the cylinders 52 to hold the slides 51 in their retracted positions and pressure is supplied to the inner ends of the cylinders 52 to move the slides 51 inwardly toward the supporting members 12 and 15 with which the slides 51 engage when in their innermost positions.

Each slide 51 has an insert positioning portion 55 provided with recesses 56 that conform to the large end $a$ of the insert A and that overlie the seat 15$a$ on the supporting member 15. The insert positioning portions 55 also have projections 57 that extend into the space between the retractable supporting members 12 and 15 closely adjacent the face of the supporting member 15, the projections 57 being shaped to receive the body portion of an insert A as shown in Fig. 8 and to support the insert in axial alinement with the socket 9. The slides 51 also have sleeve positioning portions 58 that are brought into position overlying the retractable sleeve supporting member 12 and that are provided with recesses 59 that conform to the flanged ends $b$ of the sleeves B. When the slides 51 are in their innermost positions the positioning members 55 and the retractable supporting member 15 provide a receiving pocket for a rubber insert A in which the insert will be supported in axial alinement with the bores 7 and 8 of the work pressing members. The sleeve positioning portions 58 of the slides together with the retractable supporting member 12, form a receiving pocket for a sleeve B in which a sleeve B will be supported in axial alinement with the bores 7 and 8 of the work pressing members and also in axial alinment with an insert A in the pocket formed by the portions 55 of the slide 51 and the retractable supporting member 15.

In order to permit the work pressing member 4 to move into engagement with the stationary member 3, it is necessary to retract the slides 51 prior to movement of the member 4 toward the member 3. The supporting member 12 provides a seat in which the cylindrical body of the sleeve B fits and serves to support the sleeve B and to guide it into the socket 9 when the member 4 exerts pressure on the supporting member 12 to move it inwardly against the pressure of the air in the cylinders 14. The supporting member 15, however, engages only the enlarged portion $a$ of the insert A and, in order to more adequately support the insert in proper position during the closing movement of the work pressing member 4, an alining pin 60 is provided which is movable through the bore 7, which is in axial alinement with the bores 7 and 8 and which is of a size to fit within an insert A. The alining pin 60 is advanced into engagement with the insert A prior to the retracting movement of the work positioning slides 51 and serves to guide the insert into engagement with the sleeves B during the closing movement of the movable work pressing member 4. The alining pin 60 is attached to a piston 61 that is mounted in a cylinder 62 that is axially alined with the bores 7 and 8 of the work pressing members and that is secured to the bed 1.

At the beginning of each cycle of operation of the machine the work pressing member 4 and the slides 51 are in their retracted positions and the plunger 19 is in its fully retracted position where its core receiving end 20 is clear of the core receiving opening 18 in the member 4. The alining pin 60 is also in retracted position. The slides 51 are first moved inwardly to their sleeve and insert receiving position and, after a sleeve and insert have been positioned on the seats 12$a$ and 15$a$ and a core inserted into the bore 8 through the opening 18, the alining pin 60 is advanced into engagement with an insert on the seat 15$a$, the slides 51 are retracted and pressure is delivered to the cylinder 6 to move the work pressing member 4 toward the stationary member 3. During this movement of the work pressing member the insert A is slid along the alining pin 60 into engagement with the sleeve B on the seat 12$a$ and the sleeve B is pushed into the socket 9 and the insert A is simultaneously pushed into the sleeve B as shown in Fig. 10, after which the pin 60 is retracted and the plunger 19 is advanced to force a core C into the insert A as shown in Fig. 11.

During the final closing movement of the movable work pressing member 4 the plunger 19 is moved toward the stationary work pressing member 3, past the opening 18 where it picks up a core C and positions it on the reduced end portion 20 so that upon continued movement the core will be forced into the insert as shown in Fig. 11. The leading end of the core C forms a shoulder that would normally engage with the insert A and greatly increase the resistance to the passage of the core into the rubber insert. To eliminate this difficulty means is provided for delivering a fluid, preferably a liquid under pressure, radially against the interior of the rubber insert immediately in advance of the leading end of the core C.

As shown in Fig. 13, the tapered pilot 21 is provided with an axial extension 63 that fits in a socket 64 formed in the inner end of the plunger 19. The large end of the pilot 21, which is of substantially the same internal diameter as the core receiving portion 20 of the plunger, is provided with a flat annular face 65 surrounding the projection 63 and the projection 63 is of a length slightly greater than the depth of the socket 64 so that the face 65 is spaced axially a short distance from the end face of the plunger 19 to provide a circumferential radially open channel 66 between the body of the plunger 19 and the pilot 21. The plunger 19 is provided with a series of angularly spaced axial passages 67 that open to the channel 66. Liquid under pressure is supplied to the plunger 19 through a flexible conduit 68 during engagement of the plunger with the insert A to maintain a radial flow of liquid under pressure through the channel 66 against the interior surface of the insert A to expand the portion of the insert immediately in advance of the core C and to lubricate the interior of the core C so that the core C is entered into the rubber insert without damage to the insert. Since the large end of the tapered pilot 21 is of the same diameter as the core receiving portion 20 of the plunger, the plunger and pilot will pass freely through the core C when the plunger 19 is retracted.

During the retracting movement of the work pressing member 4, an assembled bushing is discharged from the socket 9 by means of an ejector latch 69 that has a tooth 70 that engages with the flange b of the sleeve B to pull the assembled bushing out of the socket 9 during the movement of the member 4 away from the member 3 as shown in Fig. 12 of the drawing. The latch 69 is held by a spring 71 in a position in which the tooth 70 is slightly above the bottom edge of the flange B and during the closing movement of the movable member 4 the forward end of the latch 69 is moved downwardly by engagement with the flange b of the sleeve B as it moves past the flange b and into a recess 72 formed in the supporting member 12. After the tooth 70 has passed the flange b it is lifted by the spring 71 to a position where it will engage with the flange b upon retracting movement of the member 4.

While the insert A, sleeve B and core C could be fed to the machine by hand, it is preferred that they be fed automatically and to this end three chutes 73, 74 and 75 are provided. The chute 73 is shaped to receive a row of sleeves B and is positioned with its discharge end directly over the seat 12a of the retractable supporting member 12. The chute 74 is shaped to receive a row of inserts A and is positioned directly over the seat 15a of the retractable supporting member 15 and the chute 75 is positioned directly over the opening 18. The positioning portions 58 of the slides 51 are directly beneath the chute 73 and provide an extension of the chute when they are positioned over the block 12. Likewise, the positioning portions 55 of the slides 51 form extensions of the chute 74 when they are positioned over the supporting block 15.

A sleeve, an insert and a core are delivered one at a time from each of the chutes 73, 74 and 75 and, as herein shown, the discharge of the three parts to be assembled from the three chutes is simultaneous, the discharge from each of the three chutes being controlled by upper and lower stop pins 76 and 77 pivoted to the upwardly and downwardly extending arms 78 and 79 attached to a horizontal shaft 80 immediately to the rear of each of the three chutes, the shaft 80 being supported on posts 81. Upon a rocking movement of the shaft 80 the lower pins 77 are moved outwardly to release the lowermost article in each chute and the upper pins 76 are simultaneously moved inwardly to engage with the article immediately above the lowermost article so as to prevent the delivery of more than one article at a time.

Movement is imparted to the shaft 81 by means of an actuating arm 82 attached to the shaft and to a link 83 that connects the arm 82 to the armature 84 of a solenoid 85. As shown in Fig. 3, the armature 84 is vertically disposed and its weight serves to normally hold the lower pins 77 in article intercepting position. Energization of the solenoid 85 rocks the shaft 80, withdraws the stop pins 77 and advances the stop pins 76. Upon deenergization of the solenoid 85 the armature 84 drops, retracting the pins 76 and advancing the stop pins 77, resetting the feed mechanism for actuation during the next cycle of operation.

Air under pressure is supplied to the cylinders 14 and 17 from a pressure line 86. Liquid under pressure is supplied to the cylinders 6, 52 and 62 from a pressure line 87. Pressure may also be supplied to the plunger 19 from the line 87 to expand and lubricate the insert during the insertion of the core, but in order to permit recirculation of the liquid discharged from the plunger 19 without contamination of the hydraulic pressure line 87, pressure is preferably supplied to the plunger 19 from a separate pressure line 88.

The cylinder 6 is controlled by a valve 89 connected by lines 90 and 91 to opposite ends of the cylinder. The valve 89 is connected to the pressure line 87 and is provided with exhaust outlets 92. The valve 89 is a two-position valve, in one position connecting the line 90 to pressure and the line 91 to exhaust and in the other position connecting the line 91 to pressure and the line 90 to exhaust. The valve 89 is normally held in a position connecting the line 90 to pressure and the line 91 to exhaust, in which position of the valve the pressure in the cylinder 6 holds the work pressing member 4 in retracted position. A solenoid 93 is provided for shifting the valve 89 to its second position in which the line 91 is connected to pressure to move the work pressing member 4 toward the stationary work pressing member 3.

The supply of pressure to the cylinders 52 from the line 87 is controlled by a valve 94 that is normally positioned to supply pressure through a line 95 to the outer ends of the cylinders 52 to hold the slides 51 in their retracted positions, the inner ends of the cylinders 52 being connected to the valve 94 by a line 96 and through the valve to an exhaust port 97 in the normal position of the valve. A solenoid 98 is provided for shifting the valve 94 to a pressure reversing position in which the line 95 is connected to exhaust and the line 96 is connected to pressure to simultaneously move the slides 51 to their work receiving positions.

A valve 99 controls the supply of fluid to the cylinder 62, being connected to opposite ends of the cylinder 62 by lines 100 and 101 and having exhaust outlets 102. The valve 99 is a two-position valve normally held in a position connecting the pressure line 87 and the line 100 leading to the inner end of the cylinder 62 and connecting the line 101 from the outer end of the cylinder to an exhaust outlet 102 to hold the alining pin 60 in retracted position. A solenoid 103 is provided for moving the valve 79 from its normal position to a position where the line 101 is connected to the pressure line 87 and the line 100 is connected to an exhaust outlet 102 to advance the alining pin 60 into engagement with an insert A positioned on the seat 12a and between the positioning portions 55 of the slide 51.

Flow of liquid to the plunger 19 is controlled by a normally closed valve 104 that is adapted to be moved by a solenoid 105 to a position connecting the plunger through the flexible hose connection 68 to the plunger 19. The stationary work pressing member 3 is preferably provided with a drain passage 106 for carrying off liquid discharged through the plunger 19 in the core inserting operation and this liquid may be collected and recirculated through the pressure line 88.

At the end of each cycle of operation of the machine the parts are positioned as shown in Fig. 1 of the drawings, the member 4, the slides 51, alining pin 60 and plunger 19 being all in their fully retracted positions. During the cycle of operation the sequence of operations is as follows:

The valve 94 is actuated by the solenoid 98 to reverse the pressure in the cylinders 52 and move the slides 51 to work receiving position. The feed control members 76 and 77 in the three chutes 73, 74 and 75 are simultaneously actuated by means of the solenoid 85 to discharge a sleeve, an insert and a core simultaneously. The sleeve B is delivered to the seat 12a, the insert A is delivered to the seat 15a, and the core C is delivered through the opening 18 into the bore 8. Immediately after delivery of the sleeve, insert and core to the machine, the positioning pin 60 is advanced into engagement with the insert A supported by the positioning portions 55 of the work positioning slides 51 and the slides 51 are immediately moved to their retracted position. After the slides 51 have been moved out of the path of the member 4, pressure is supplied to the cylinder 6 to move the member 4 toward the member 3 to move the insert into engagement with the sleeve and to press the sleeve into the socket and the insert into the sleeve, as shown in Figs. 9 and 10.

Before completion of the closing movement of the member 4 the alining pin 60 is withdrawn and the crankshaft 25 is clutched to the pulley 35 to impart a reciprocating stroke to the plunger 19 to move the plunger and core into engagement with the insert and to force the core into the insert as shown in Fig. 11 of the drawings. Immediately after the insertion of the core the work pressing member 4 is moved to its retracted position and, when the plunger 19 and work pressing member 4 reach their retracted positions, the cycle of operations is completed, the assembled bushing having been ejected from the machine by the latch 69 during the retracting movement of the member 4.

The sequence of operations may be controlled by any suitable timing mechanism. As herein illustrated, the timing mechanism is operated by a timer motor 107 mounted on the bed 1 and a driving shaft 108 to which are attached a series of control cams for initiating the operation of the various parts of the machine in the proper sequence during each revolution of the shaft 108.

As shown in Fig. 15 of the drawings, a cam 109 on the shaft 108 operates a normally open switch 110 to energize the solenoid 98 to reverse the pressure on the cylinders 52 to move the slides 51 to their work receiving positions.

A cam 111 on the shaft 108 operates a normally open switch 112 to energize the solenoid 85 to actuate the control fingers 76 and 77 to discharge a sleeve A, an insert B and a core C from the chutes 73, 74 and 75.

A cam 113 on the shaft 108 actuates a normally open switch 114 to energize the solenoid 103 to reverse the pressure in the cylinder 62 and advance the aligning pin 60 into engagement with an insert on the seat 15a.

A cam 115 on the shaft 108 actuates a normally open switch 116 to energize a solenoid 93 to reverse the pressure in the cylinder 6 and move the work pressing member 4 toward the stationary work pressing member 3.

A cam 117 on the shaft 108 operates a normally open switch 118 to energize the solenoid 38 to trip the clutch control latch 36 to cause a single revolution to be imparted to the crankshaft 25 to reciprocate the core inserting plunger 19.

A cam 119 on the shaft 108 operates a normally open switch 120 to energize the solenoid 105 to deliver liquid under pressure to the plunger 19 during the entry of the core C into the insert A.

Each of the cams is provided with a raised portion to hold the switch operated by it in closed position during a predetermined portion of the cycle of operation of the machine, each of the parts operated by the control solenoids being designed to return to a normal position when the solenoid is deenergized, so that all movable parts return to their initial positions after their control solenoids are deenergized. The timer mechanism normally operates continuously and causes a complete cycle of operations to be performed to assemble a bushing during each revolution of the timer shaft.

In order to prevent damage to the machine in the event that an assembled bushing should not be ejected from the socket 9 during retraction of the member 4, a normally closed safety switch 121 is placed in series with the solenoid 38 controlling the operation of the core inserting plunger 19 and the solenoid 85 controlling the feed of articles from the chutes 73, 74 and 75. The switch 121 is mounted on the stationary work pressing member 3 and is actuated by a control pin 122 slidably mounted in the member 3 and having a rounded end 123 that normally projects slightly into the sleeve socket 9. The pin 122 is pressed inwardly by a spring 124 and is moved outwardly to open the switch 121 whenever a sleeve b enters the socket 9. After an assembled bushing is ejected from the socket 9, the pin 122 moves inwardly and closes the switch 121. If for any reason the assembled bushing should become jammed in the socket 9 so that it is not removed by the ejector latch 69, the switch 121 will be held open so that the solenoid 38 cannot be energized to cause actuation of the core inserting plunger 19. The clutch 34 is actuated by the solenoid 38 before completion of the closing movement of the work pressing member 4 and before the sleeve B is moved into engagement with the switch 121, so that the switch 121 does not interfere with the normal operation of the core inserting plunger. The switch 121 is also normally closed when the switch 112 is closed by the cam 111 so that the solenoid 85 will be energized to feed a sleeve B, an insert A and a core C to the machine unless the bushing assembled during the preceding cycle should remain in the socket a.

It is to be understood that in accordance with the provisions of the patent statutes, variations and modifications of the specific devices herein shown and described may be made without departing from the spirit of the invention.

What we claim is:

1. In a machine for assembling resilient bushings, a bed having a longitudinal way, a pair of work pressing members, one slidable on said way toward and away from the other, said members having opposed inner faces provided with sockets that have a common axis parallel to said way, each of said members having a lower part that has a concave top that forms the lower half of the socket of said member and that is movable inwardly from its socket forming position to provide a supporting seat between said opposed faces, means for reciprocating said slidable member, means for moving said parts inwardly to their seat forming positions during the portion of the stroke in which said work pressing members are spread apart and for yieldably holding said parts in their seat forming positions, and means for delivering a tubular sleeve and an insert to said seats and for holding them in positions of axial alinement on said seats so that the insert is forced into the sleeve as the slidable work pressing member approaches the other work pressing member.

2. A machine for assembling resilient bushings as claimed in claim 1, in which the means for holding the sleeve and insert in axial alinement on the seats are elements mounted for lateral movement on the bed toward and away from opposite sides of said seats.

3. A machine for assembling resilient tubular bushings that have an outer tubular sleeve, an inner tubular core and a tubular elastic rubber insert under radial compression between the sleeve and core comprising a supporting bed having a longitudinal way, a pair of work pressing members, one fixed to said bed and the other slidable on said way toward and away from the first and into and out of work gripping position, one of said work pressing members having a bore parallel to said way of a size to slidably receive a core and a lateral opening through which a core may be entered into the bore, the other of said work pressing members having a sleeve receiving socket axially alined with said bore, means including seats for supporting a sleeve and an insert between said work pressing members in axial alinement with one another and with said bore, a plunger slidable in said bore and haivng a core receiving end portion of reduced diameter that terminates in a tapering insert engaging end, said plunger being movable from a position in which said lateral opening is between the plunger and the work engaging face of the work pressing member in which the plunger slides to a position in which said tapered end is beyond the said face, means for moving one of said work pressing members toward and away from the other into and out of work gripping position, means for delivering a sleeve and an insert to said seats while said work pressing members are out of work gripping position, means for delivering a core through said lateral opening into the path of said plunger, means for reciprocating said plunger to insert a core into said insert while the sleeve and insert are clamped between said pressing members, and means for applying an expanding pressure to the interior of the insert during the insertion of the core.

4. A machine for assembling resilient tubular bushings comprising a pair of opposed work pressing members, one of said members having a sleeve receiving socket opening toward the other member, movably mounted elements for supporting a sleeve and an elastic tubular rubber insert between said work pressing members with said sleeve between said insert and said socket and with said sleeve and insert in axial alinement with one another and with said socket, an alining pin of a size to slidably fit within an insert axially alined with said socket and movable axially through said socket and sleeve and into an insert on said supporting means to provide a support on which the insert may slide, actuating means for moving one of said work pressing members toward the other in the direction of the socket axis to press the insert into the sleeve and the sleeve into said socket, means for advancing said alining pin into engagement with the insert during the initial portion of the movement of the work pressing member, and means for moving said supporting elements out from between said work pressing members after engagement of said pin with the insert whereby the sleeve may be moved into said socket and the insert pressed into the sleeve, while the insert is supported on said alining pin.

5. A machine for assembling resilient bushings comprising a bed, a pair of work pressing members on said bed, one fixed and the other movable linearly on said bed from a retracted position toward said fixed member and back to its retracted position, one of said members having a sleeve receiving socket opening toward the other member, laterally movable positioning members movable from positions laterally clear of said work pressing members on opposite sides thereof to supporting positions between said work pressing members, said positioning members having meeting faces recessed to provide axially spaced sleeve and insert receiving pockets for supporting a sleeve and an insert in axial alinement with one another and with said socket, a reciprocable alining pin axially alined with said socket and of a size to slidable fit within an insert, said pin being movable axially into a sleeve and an insert supported in axially spaced relation by said positioning members, means for actuating said movable positioning members, said movable work pressing members and said alining pin sequentially to move said positioning members to receiving position, to move said alining pin into insert engaging position, to advance said movable work pressing member to engage the sleeve in said socket and to slide the insert along said pin and into said sleeve, and to withdraw said positioning members during the closing movement of said movable work pressing member.

6. An assembling machine as set forth in claim 5 in which means is provided for feeding a sleeve and an insert into said pockets after movement of said positioning members to receiving position.

7. An assembling machine as set forth in claim 5 in which means is provided for withdrawing said alining pin from the insert and for inserting a core into the insert while the sleeve and insert are positioned in said socket and clamped between said work pressing members.

8. A machine for assembling resilient tubular bushings that have an outer sleeve, an inner tubular core and a tubular elastic rubber insert under radial compression between the sleeve and core comprising work pressing means having a pair of work pressing members having opposed clamping faces and mounted for relative linear movement toward and away from one another and into and out of work gripping position, one of said work pressing members having a bore of a size to receive said core with a sliding fit and extending in the direction of said linear movement, a plunger slidably fitting in said bore and movable toward and away from work held between the gripping faces of said members, means for supporting a sleeve and an insert in axially spaced relation between said work pressing members and in axial alinement with said bore, means for actuating said work pressing means to press said insert into said sleeve and to clamp said sleeve and insert between said work pressing members in axial alinement with said bore, means for delivering a core into said bore between said plunger and said sleeve and insert, and means for actuating said plunger to advance the same into engagement with said core and to force said core into said insert clamped in said sleeve by said work pressing members.

9. A machine for assembling resilient tubular bushings as claimed in claim 8 in which means is provided for actuating said work pressing means to a spread apart work receiving position and from the work receiving position to the work clamping position and for advancing the plunger toward the work pressing members while said members are in work clamping position and to retract the plunger, and in which means is provided for delivering a sleeve and an insert to the supporting means between said work pressing members while said work pressing members are in spread apart work receiving position and for delivering a core into the bore of the work pressing member while said plunger is retracted.

10. A machine for assembling resilient tubular bushings as claimed in claim 8, in which the work pressing member having the core and plunger receiving bore is provided with a lateral opening through which a core may be entered into the bore and in which the plunger is movable to a retracted position in which said lateral opening is between the plunger and the clamping face of the work pressing member provided with the core receiving bore.

11. A machine for assembling resilient tubular bushings as claimed in claim 8, in which the means for supporting the sleeve and insert in axial alinement between the work pressing members includes positioning members movable laterally in opposite directions into and out of positions between said work pressing members and formed to provide sleeve and insert receiving pockets.

12. A machine for assembling resilient tubular bushings as claimed in claim 8, in which the work pressing members have recesses opening into their opposed faces and in which the sleeve and insert supporting means includes members that are movable parallel to the axis of the core receiving bore from positions in said recesses to supporting positions between said work pressing members.

13. A machine for assembling resilient tubular bushings as claimed in claim 8, in which the core inserting plunger has a core receiving portion of reduced diameter at its core receiving end that is of a size to slidably fit in a core and that terminates in a tapered end, said core receiving portion being of a length to support the core with its leading end inwardly of and adjacent said tapered end.

14. A machine for assembling resilient tubular bushings as claimed in claim 13, in which means is provided for delivering fluid under pressure radially from the plunger and against the interior of the insert to expand the same immediately in advance of the core on said plunger during the passage of the leading end of the core through the insert.

References Cited in the file of this patent

UNITED STATES PATENTS

| | | |
|---|---|---|
| 788,568 | Welsh | May 2, 1905 |
| 979,438 | Courtney | Dec. 27, 1910 |
| 1,803,491 | Thiry | May 5, 1931 |
| 1,881,533 | Hardiman | Oct. 11, 1932 |
| 1,959,254 | Zerk | May 15, 1934 |

(Other references on following page)

UNITED STATES PATENTS

| | | | | | |
|---|---|---|---|---|---|
| 2,031,797 | Tarbox | Feb. 25, 1936 | 2,604,692 | Broden | July 29, 1952 |
| 2,133,161 | Colbert | Oct. 11, 1938 | 2,649,886 | Palmer | Aug. 25, 1953 |
| 2,278,643 | Braun | Apr. 7, 1942 | 2,660,780 | Beck | Dec. 1, 1953 |
| 2,347,780 | Hermanns | May 2, 1944 | 2,684,524 | Beck | July 27, 1954 |
| 2,492,227 | Korecky | Dec. 27, 1949 | 2,690,001 | Cowles | Sept. 28, 1954 |
| | | | 2,741,021 | Hutton | Apr. 10, 1956 |